(12) United States Patent
Wright et al.

(10) Patent No.: US 7,685,425 B1
(45) Date of Patent: Mar. 23, 2010

(54) SERVER COMPUTER FOR GUARANTEEING FILES INTEGRITY

(75) Inventors: Trevor Wright, Ipswich (GB); Nigel Tedeschi, Ipswich (GB)

(73) Assignee: British Telecommunications public limited company, London (GB)

( * ) Notice: Subject to any disclaimer, the term of this patent is extended or adjusted under 35 U.S.C. 154(b) by 0 days.

(21) Appl. No.: 09/936,210

(22) PCT Filed: Mar. 22, 2000

(86) PCT No.: PCT/GB00/01078

§ 371 (c)(1),
(2), (4) Date: Sep. 10, 2001

(87) PCT Pub. No.: WO00/59177

PCT Pub. Date: Oct. 5, 2000

(30) Foreign Application Priority Data

Mar. 31, 1999 (GB) .................................. 9907442.9
Jul. 13, 1999 (EP) .................................. 99305557

(51) Int. Cl.
*H04L 9/00* (2006.01)
*H04L 9/32* (2006.01)
*G06F 7/04* (2006.01)

(52) U.S. Cl. ........................ 713/176; 713/187; 713/188; 713/193; 713/194; 726/27; 726/28; 726/29; 726/30

(58) Field of Classification Search ......... 711/118–122; 707/2; 713/176, 178, 187–188, 193–194, 713/167; 380/285, 229–233; 726/1–7, 24–30
See application file for complete search history.

(56) References Cited

U.S. PATENT DOCUMENTS

| 5,724,425 | A | * | 3/1998 | Chang et al. .................. 705/52 |
| 5,781,711 | A | | 7/1998 | Austin et al. |
| 5,835,943 | A | * | 11/1998 | Yohe et al. ................... 711/118 |
| 5,978,791 | A | * | 11/1999 | Farber et al. ................... 707/2 |
| 6,367,012 | B1 | * | 4/2002 | Atkinson et al. ............ 713/176 |
| 6,411,716 | B1 | * | 6/2002 | Brickell ....................... 380/286 |
| 6,415,280 | B1 | * | 7/2002 | Farber et al. ................... 707/2 |
| 6,745,327 | B1 | * | 6/2004 | Messing ....................... 713/170 |

FOREIGN PATENT DOCUMENTS

EP          0915600 A2     5/1999

* cited by examiner

*Primary Examiner*—Longbit Chai
(74) *Attorney, Agent, or Firm*—Nixon & Vanderhye P.C.

(57) ABSTRACT

A server computer storing computer files, each computer file having an associated unique digital signature, receiving requests for access to one or more such computer files, only allows access to the or each computer file if their associated digital signatures are valid. Thus, if a computer file has been tampered with by an unauthorized third party, the digital signature associated with that computer file will prove to be invalid when checked and the server computer will not serve the computer file at all. In this way, a computer file that has been tampered with can never leave the server computer, much improving the security of the stored computer files.

8 Claims, 5 Drawing Sheets

SERVER COMPUTER FOR GUARANTEEING FILES INTEGRITY

BACKGROUND

1. Technical Field

The present invention relates to a method of and apparatus for the serving of computer files. It has application, in particular, to the secure serving of digitally signed computer files.

2. Related Art

The notion of associating a sign of some form with a document or an object to denote, for example, authorship or ownership has long been in existence. It is an unfortunate reflection on human nature that the related notion of falsely associating a sign with a document or with an object to indicate false authorship or ownership has also long been in existence.

With the advent of the printing press and the printed document and, more recently, the digital or electronic computer and the digital or electronic document, the problems of the faithful reproduction and the convenient editing or alteration of documents have been much ameliorated.

As will be well known, a digital document can typically be altered or copied as many times as is wished without any change in quality since it is only the digital bits representing the information content of the document that are changing. If a digital document is created by a first party and then covertly altered by a second party, it may well be difficult for a third party subsequently reading the document to tell that it has been altered.

The advent of networked communication between computers and in particular the rise of the Internet and the World Wide Web has meant that vast numbers of computers all over the world can now communicate with each other using common protocols. Electronic documents are often now made available as Web Pages on a Web Site.

It will be well known that the World Wide Web (or simply 'Web' hereinafter) has a wide variety of associated concepts and standards. A rich source of information relating to these concepts and standards is the World Wide Web Consortium (http://www.w3c.org), a body hosted by the Laboratory for Computer Science at the Massachusetts Institute of Technology (MIT). Concepts such as a 'Web Server', a 'Web Site', a 'Web Page', a 'Web Browser', a 'Hyperlink' and a 'Uniform Resource Locator' and standards such as the 'HyperText Transport Protocol (HTTP)' and the 'HyperText Markup Language (HTML)' will be well known.

A problem faced by those parties wishing to distribute content in the form of electronic documents or files, for example, on the World Wide Web, has been the vulnerability of the stored content to deliberate alteration by unauthorised third parties accessing the content over a communications network.

Should an unauthorised third party manage to access a given Web Server, they might, for example, edit a Web Page stored on that Web Server. When the Web Page is subsequently viewed with a Web Browser, the content of the Web Page would then reflect the message of the unauthorised third party rather than the original content provider.

It will be appreciated that a wide variety of motives may exist for unauthorised third parties to attempt to subvert the message delivered by a given piece of content but it is probably safe to assume that in all cases the content provider would prefer not to have the message delivered by its content tampered with and then presented to the browsing world as its own.

A first present day approach to tackling this problem of the vulnerability of stored content to alteration by unauthorised third parties might attempt to ensure that the stored content is never accessible to unauthorised third parties.

One example of this approach is the use of a so-called 'firewall'. As will be well known a firewall may be used to protect a computer connected to a network by controlling traffic between the computer and the network such that only certain types of traffic, as defined by the computer administrator, are allowed to pass from the network to the computer or vice versa. In theory this should prevent unauthorised third parties from accessing the computer from the network such that they could alter the content stored on that computer. Naturally such a firewall cannot protect the stored content from alteration by a malicious user validly operating inside the firewall In practice it will be well known that real-world implementations of firewalls are often far from secure.

A second approach, mindful of the fact that the content might have been altered either when stored or during transmission over a communications channel, is to perform a check on downloaded content to see if it has been tampered with.

One simple example of this second approach is the use of a so-called 'checksum'. As will be well known a checksum is computed from a given block of data, yielding a value which is then associated with that block of data. If the checksum computation is run again, any change in the data will cause a change in the checksum value. Checksum methods are most often employed as a simple check to detect corruption during transmission of data. In theory then, when a given piece of content is downloaded along with an initial checksum value, a new checksum value can be computed for the downloaded content, which can then be compared with the original checksum value sent along with the content. If the original checksum value and the newly derived checksum value are the same then there may be some confidence that the content has not been altered after the computation of the original checksum value, which might be either whilst stored or during transmission.

In practice it will be appreciated however, that any unauthorised third party able enough, for example, to access and tamper with stored content may well be able enough to alter the original checksum accordingly. If this were done then the checksum comparison performed when the content is downloaded would falsely indicate that the content had not been tampered with since its original storage.

More sophisticated examples of this second approach involve the use of so-called 'digital signatures'. The theory and practice of digital signatures have become very well known over the past few years as the Internet and more particularly the World Wide Web have experienced exponential growth.

A treatment of digital signatures may, for example, be found in 'Applied Cryptography: Protocols, Algorithms and Source Code in C' by Bruce Schneier, second edition 1996, John Wiley & Sons. A further treatment of digital signatures may be found in 'PGP: Pretty Good Privacy' by Simson Garfinkel, first edition 1995, O'Reilly & Associates. Terms such as 'public key', 'private key', 'hash function' and 'message digest function' will be well understood.

Digital signature techniques utilise so-called 'public key' cryptographic methods. As will be well known, public key cryptography uses an algorithmically related pair of keys, a so-called 'public key' and a so-called 'private key', to encrypt messages, rather than the single key of more traditional symmetric key cryptography. The public key is intended to be widely distributed in the public domain whereas the private key must be kept absolutely secret. Crucially, knowledge of the public key does not allow the private key to be determined. Typically, a message encrypted with a public key is decrypted and can only be decrypted with the corresponding private key. The encryption process is symmetric however such that an encryption operation performed with the private key can be decrypted with the public key. A successful decryption with a given public key guarantees that the message was encrypted with the matched private key.

Public key cryptography can be used to attempt to secure a communications channel such that content transmitted over that channel cannot be intercepted and compromised. One example of such an application is the Secure Sockets Layer (SSL) protocol, originally developed by the Netscape Communications Corporation (Mountain View Calif., USA). For communication between, for example, a client computer and a server computer, such a protocol first authenticates the server computer using public key cryptography and then shares a symmetric key for use in encrypting all further communication between the client and server computers. A protocol such as SSL thus both protects against a first server computer pretending to be a second server computer and serving data falsely purporting to be from that second server computer and prevents any unauthorised third party intercepting and altering communications during transmission. Such a protocol is, however, aimed at the securing of content during transmission, not at solving the problem of the stored content being vulnerable to alteration.

Digital signature techniques using public key cryptography allow checks not only as to 'authentication', guaranteeing that a digitally signed 'document' does in fact originate from the party whose signature the document bears but also as to 'integrity', guaranteeing that the contents of the document have not been tampered with since the originating party digitally signed the document.

The process by which digital signatures are employed in order to perform a check on downloaded content to see if it has been tampered with will be discussed below in greater detail having regard to the invention. It will suffice at this point to consider the functionality provided through the use of digital signatures in the following example of the second approach.

The Microsoft Corporation (Redmond Wash., USA) has developed so-called 'Authenticode™'. Authenticode™ software is installed on client computers and is directed towards checking software that has been downloaded over a network from, for example, a server computer, to see if the software has been tampered with in an unauthorised fashion. Each such piece of code will have been digitally signed. Having regard to a particular piece of digitally signed code downloaded over a network, before the installation or execution of the code, Authenticode™ may check the digital signature to see if it is valid. A selection of a 'high', 'medium' or 'none' Authenticode™ safety setting must be made in the client software. With a 'high' setting Authenticode™ will not allow the installation or execution of code whose associated digital signature proves to be invalid. With, however, a 'medium' setting, Authenticode™ will warn the user that the code is 'untrustworthy' but will allow the option of installing or executing it if the user wishes. With a safety setting of 'none', Authenticode™ provides no such warning.

As will be evident, an arrangement such as Authenticode™, checking code downloaded to a client at that client, can only go so far in protecting stored content. Such checking performed at the client will involve the sending of the content in question to the client computer. In this way, content that has been tampered with will still be sent out over the network to the client. It may be that an arrangement such as Authenticode™ may be configured to deny the installation or execution of an 'untrustworthy' piece of code, but the code still exists at the client and it cannot be guaranteed that an able enough user could not access it. Alternatively, it is clear that such a configuration can be changed to allow the installation or execution of 'untrustworthy' code if so wished.

It will be appreciated that neither with the first approach to the problem of the content alteration (attempting to ensure that the stored content is never accessible to unauthorised third parties), nor with the second approach, (attempting to perform a check on downloaded content to see if it has been tampered with), is it guaranteed that the altered content will not be seen.

In the first case if, for example, the relevant firewall had been breached and unbeknownst to the Web Site administrator the stored content had been altered, the altered content would be viewed by anyone accessing the Web Page until such time as the Web Site administrator noticed or was informed of the alteration and took corrective action.

In similar fashion, in the second case if, for example, the digital signature authentication of the relevant downloaded content had failed, then, as mentioned above, although the content will be deemed 'untrustworthy', it may well be open to the 'downloader' to view or otherwise execute the 'untrustworthy' altered content. Indeed, a situation can be imagined where the notoriety of a Web Page that had been tampered with by an unauthorised third party is the very reason for persons wanting to view the Web Page, before the Web Site administrator can take corrective action. Again, even if the downloader is prevented from, for example, executing an untrustworthy file, that file has still been sent out over a network and it may well be possible to access a copy of the file at some point in the process.

BRIEF SUMMARY

In contrast with these present day approaches however, according to an exemplary embodiment of the invention there is provided a server computer comprising: means arranged to store one or more computer files; means arranged to store one or more digital signatures; each computer file having an associated digital signature; means arranged to receive a request from at least one other computer for access to at least one computer file stored on said server computer; means arranged to retrieve the or each requested computer file; means arranged to retrieve the digital signature associated with one or each requested computer file; means arranged to validate the digital signature associated with the or each requested computer file; and means arranged to deny said other computer access to the or each requested computer file if the digital signature associated with the or each respective requested computer file is invalid.

Advantageously, in this way it is assured that if the computer file storage security is breached and one or more files tampered with, it will not be possible for any external party to see the results of the tampering. No access can be given to a computer file unless the digital signature associated with that computer file has been validated. In particular, no copy of a computer file can leave the file server computer where it is stored unless the digital signature associated with that computer file has been validated. Thus, if the file has been tampered with, no external third party will be able to obtain a copy of it. There can be no possibility of the message or functionality of the original computer file being subverted by an unauthorised third party to their own ends.

A method of operating a server computer is also provided.

BRIEF DESCRIPTION OF THE DRAWINGS

An embodiment of the invention by way of example will now be discussed with reference to the accompanying drawings in which.

DETAILED DESCRIPTION OF EXEMPLARY EMBODIMENTS

Figure 1A:
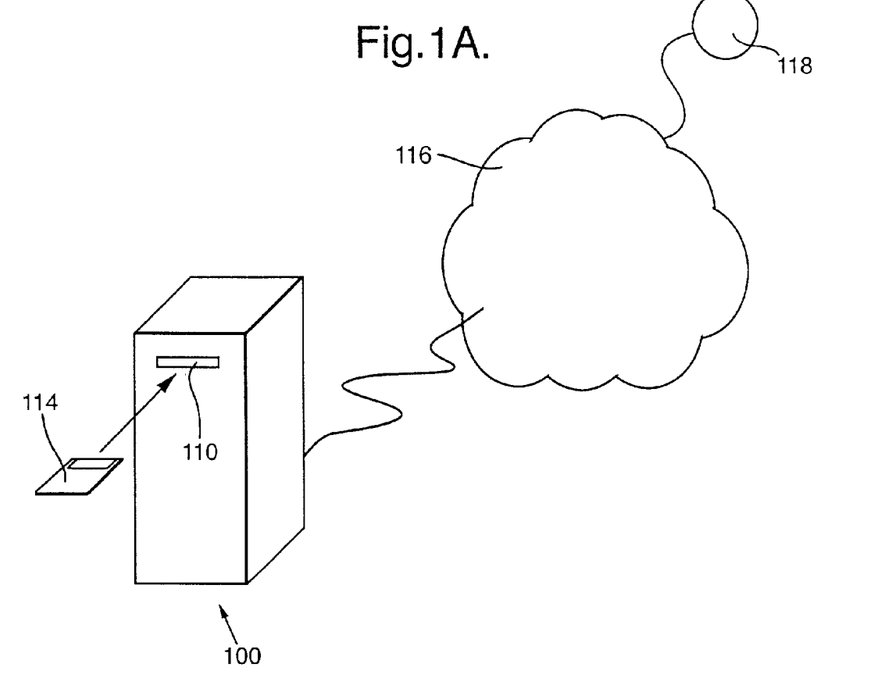
FIG. 1A represents first and second conventional computers connected to a communications network.
Figure 1B:
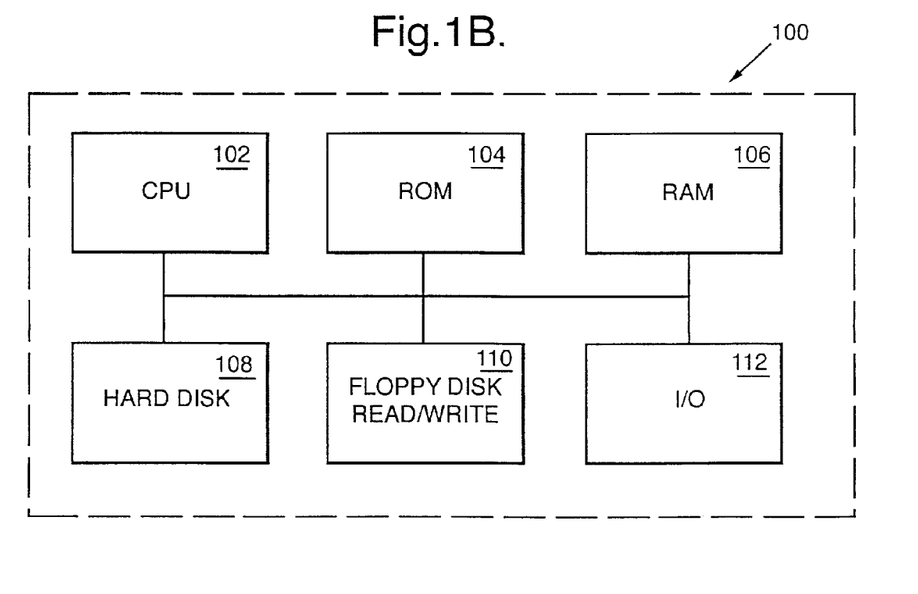
FIG. 1B represents such a conventional computer.

FIG. 1A illustrates a conventional general purpose computer 100, suitable for use as a Web Server. Such a computer 100 is illustrated in FIG. 1B and will typically have at least a central processing unit (CPU) 102, read-only memory (ROM) 104, random-access memory (RAM) 106, a storage device such as a hard disk 108, a device for reading from and writing to storage media such as a floppy disk drive 110 for reading from and writing to floppy disks and input and output ports 112 for connection to other devices or communications networks.

Returning to FIG. 1A, a floppy disk 114 is indicated for the floppy disk drive 110 to read from or write to. The computer 100 is connected to a communications network 116, which in this embodiment is to be understood as the well known Internet, utilising, for example, Transmission Control Protocol/Internet Protocol (TCP/IP). A second conventional general purpose computer 118, suitable for use as a Web Client, is similarly connected to the Internet communications network 116.

The computer 100 may utilise any suitable operating system, well known examples being Microsoft Windows™ NT, Linux or any one of the other many versions of Unix. Application programs may be written in any of many well known suitable languages in which to write application programs, one well known example of which is C++.

Such an operating system and application programs may be loaded onto the storage device 108 of the computer 100.

The functionality disclosed in accordance with this embodiment of the invention may be implemented as a software module application program to be executed by the computer 100. This software application program may then be stored in any suitable computer readable storage media form, for example on floppy disk 114, for loading into the computer 100, via the floppy disk drive 110, for execution. A well known alternative would be to store the software application on a CD-ROM (not shown) for loading into the computer 100 via a CD-ROM drive (not shown) for execution. A further well known alternative would be to download the software application program over the network 116, for execution by the computer 100.

In this embodiment the computer 100 has one or more software application programs loaded onto it which, when executed, will cause the computer 100 to operate as a Web Server. One or more Web Documents will be stored on the appropriate storage device of the Web Server, as is conventional.

One or more software application programs loaded onto the second computer 108, including a Web Browser program, when executed, enable communication using World Wide Web protocols and in particular allow the viewing of Web Pages, for example those hosted on the Web Server computer 100, using a Web Browser.

Figure 2:
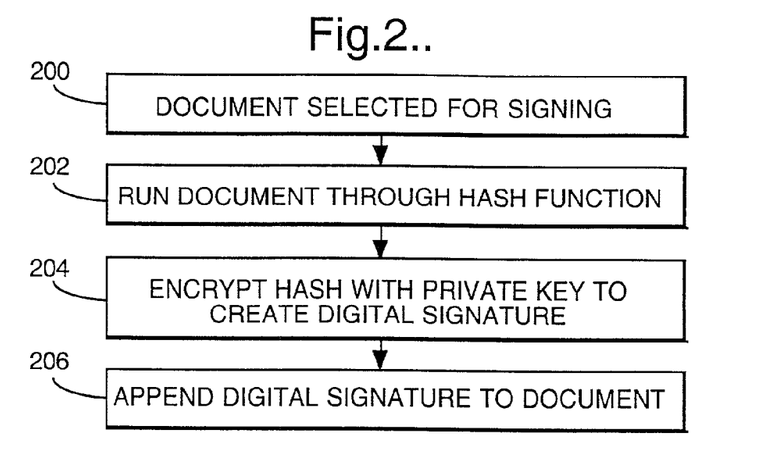
FIG. 2 illustrates a procedural flowchart for the digital signing of a digital document.
Figure 3:
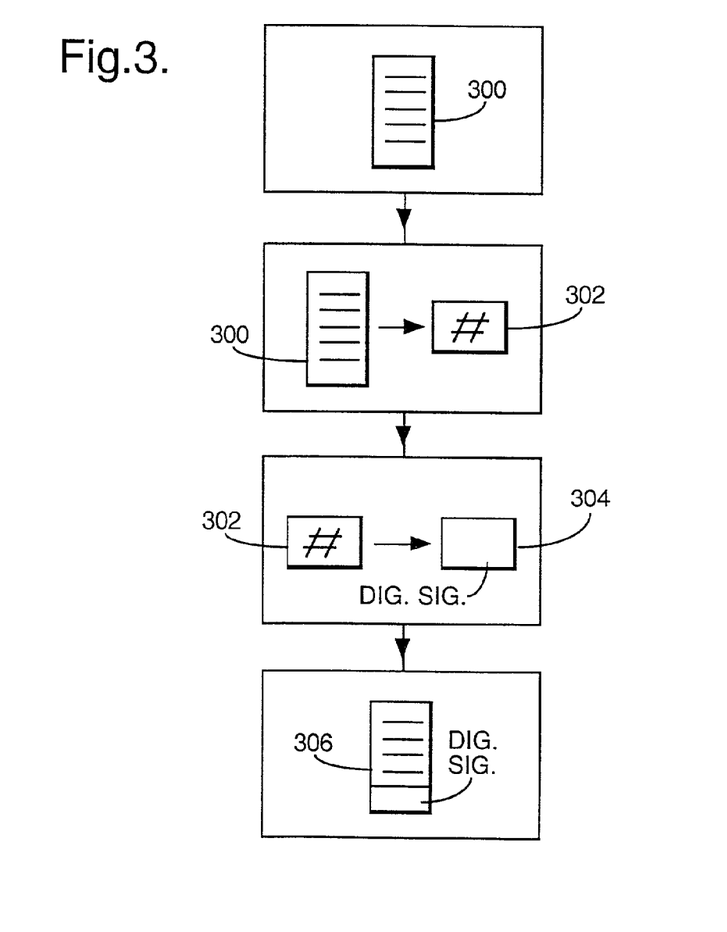
FIG. 3 illustrates the entities involved in the process of FIG. 2.

A conventional digital signing process will now be discussed having regard to FIGS. 2 and 3. It will be appreciated that the structure of FIGS. 2 and 3 is mirrored; FIG. 2 illustrates a procedural flowchart of the process of the digital signing of a digital or electronic document whilst FIG. 3 illustrates in simple fashion the behaviour of the corresponding entities. It will be further appreciated that the steps indicated in the procedural flowchart will be carried out through execution of the software application running on the Web Server 100.

By way of example in this embodiment, the Web Documents considered are Web Pages, typically HyperText Markup Language (HTML) documents, stored on the appropriate storage device of the Web Server 100, in this example, the hard disk. It is to be noted however that this example is non-limiting; many other forms of computer file are equally able to be treated according to the invention (including, for example, documents of formats other than HTML, images in, for example, Joint Photographic Experts Group (JPEG) format and downloadable software programs).

In first step 200 a document is selected for digital signing. Such a document 300 is illustrated in FIG. 3.

In a second step 202, the document to be signed is run through a so-called 'hash' function. The hash function derives a short representation of the document, which is often referred to as the 'hash' of the document. The document to be signed 300 and the hash of the document to be signed 302 are figuratively illustrated in FIG. 3. The hash function and the hash of the document are often alternatively referred to as the 'message digest' function and the 'message digest' respectively. Two well known examples of hash functions are the MD5 and SHA hash functions.

It will be well known that the hash of a document produced by a hash function is remarkably sensitive to the contents of the document. If, for example, a text document is altered by so much as the insertion of a full stop, then a hash generated before the insertion of the full stop and a hash generated after the insertion of the full stop will, in general, be completely different.

In a third step 204, a digital signature is created by encrypting the hash of the document using a private key. It will be appreciated that this private key might be the private key of any of a number of parties including, for example, the creator of the content, the owner of the content or the administrator of the content. The notion of an approved signing party with associated approved keys will be discussed below. The hash of the document to be signed 302 and the digital signature 304 are illustrated in FIG. 3.

Once so created, the digital signature for the document to be signed may be stored on the appropriate storage device of the Web Server 100, in this example, the hard disk.

Alternatively in an optional fourth step 206, the digital signature so created is appended to the document to be signed to create a digitally signed document. The digitally signed document 306 is illustrated in FIG. 3. The digitally signed document can then be stored on the appropriate storage device of the Web Server 100, in this example, the hard disk.

A document serving process according to the invention will be discussed having regard to FIGS. 1, 4, 5 and 6. Again, it will be appreciated that steps indicated in the procedural flowcharts will be carried out through execution of the software application running on the Web Server 100.

Figure 4:
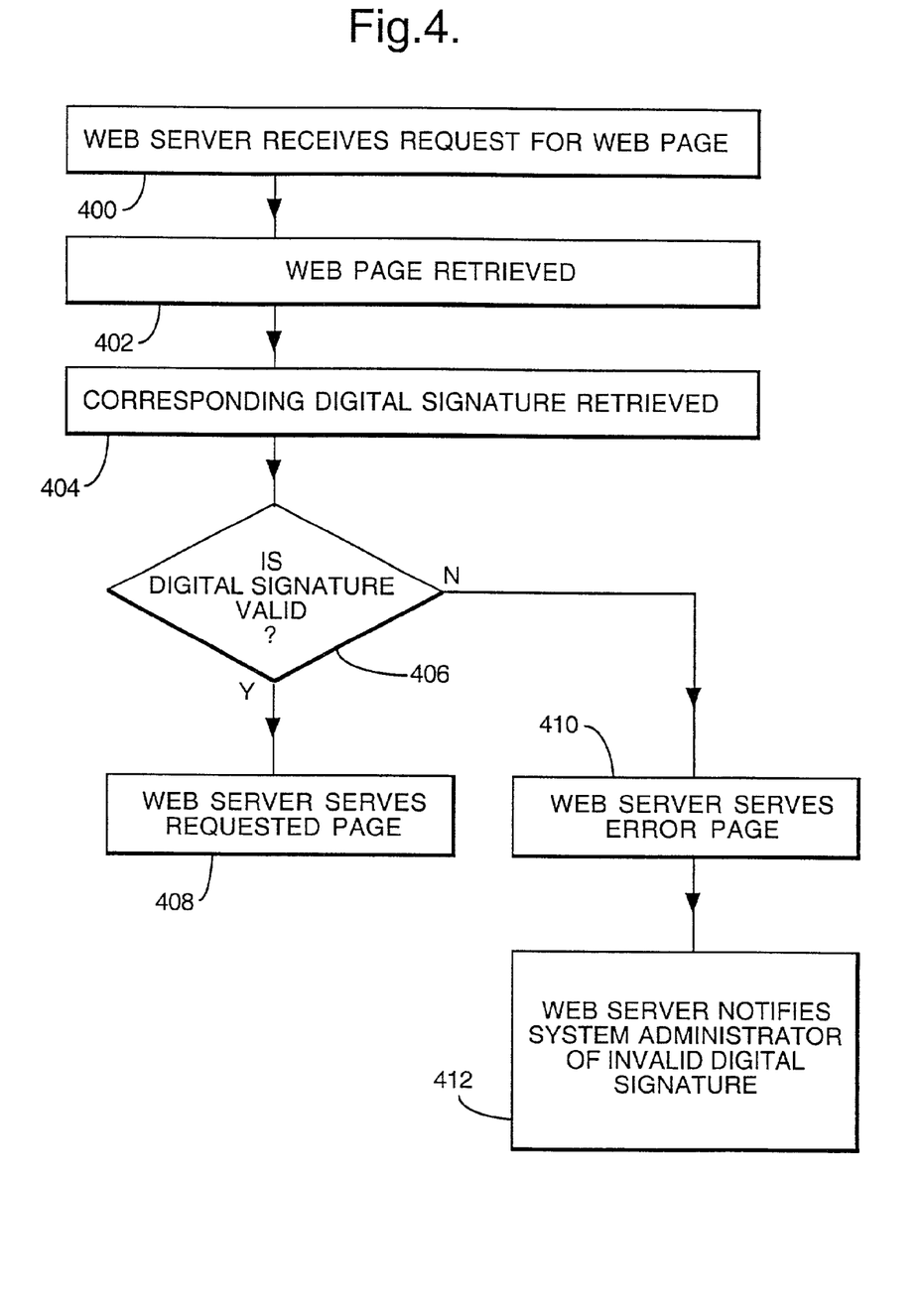
FIG. 4 illustrates a procedural flowchart for the serving of digitally signed documents.

Having regard to FIGS. 1 and 4, in a first step 400, the Web Server 100 receives a request from the second computer 114 for access to a given Web Page stored on the Web Server 100. As will be well known, this request will typically be initiated through the user of the second computer 114 clicking on a hyperlink, the Uniform Resource Locator (URL) of which points to the given Web Page. As will be further well known, the Web Server 100 will have a process monitoring TCP port 80 for receiving incoming connections from clients. Once a TCP connection has been established, then the HTTP request for the Web Page can be made as above.

In a second step 402, the Web Page corresponding to the URL request is retrieved from the appropriate storage device of the Web Server 100, in this example, the hard disk.

In a third step 404 the digital signature corresponding to that Web Page is also retrieved from the appropriate storage device of the Web Server, in this example, the hard disk. It will be appreciated that if the digital signature had already been appended to the document in accordance with optional step 206 above, then this step would be performed upon retrieval of the document itself.

In a fourth step 406, the digital signature associated with the document is validated.

Figure 5:
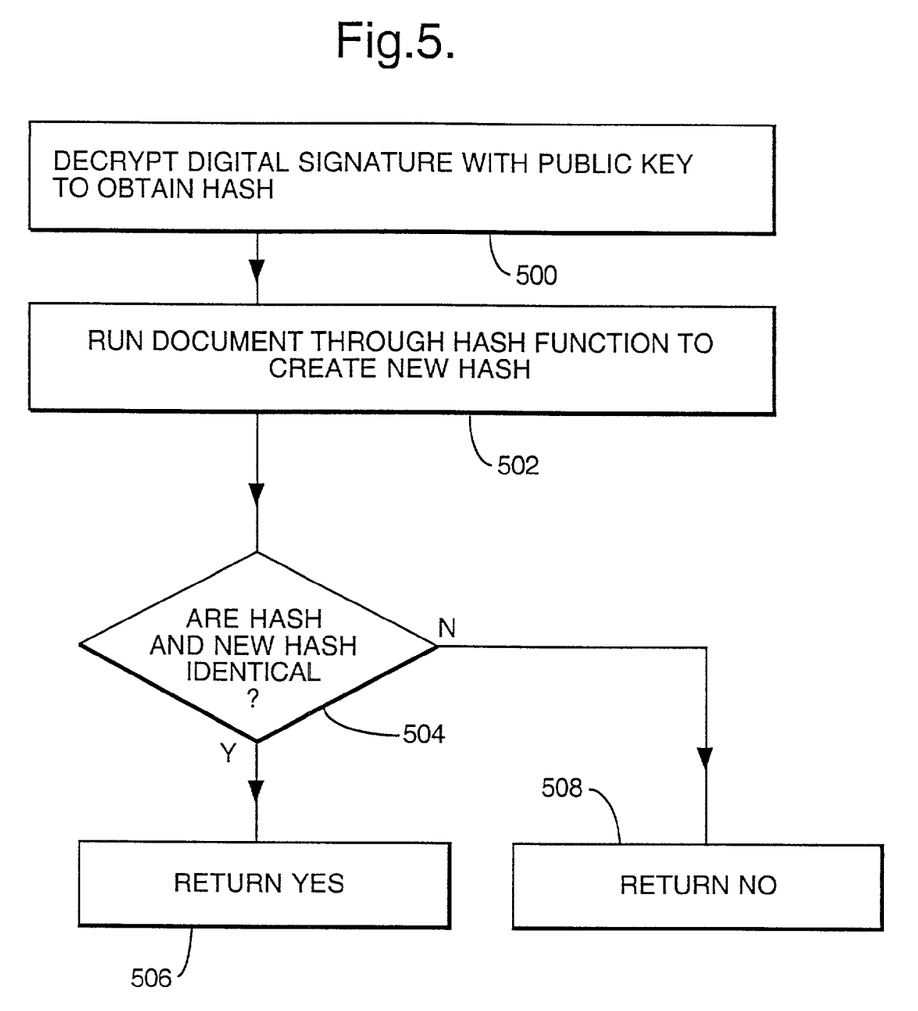
FIG. 5 illustrates a procedural flowchart for the authentication of the digital signature of a digitally signed document.
Figure 6:
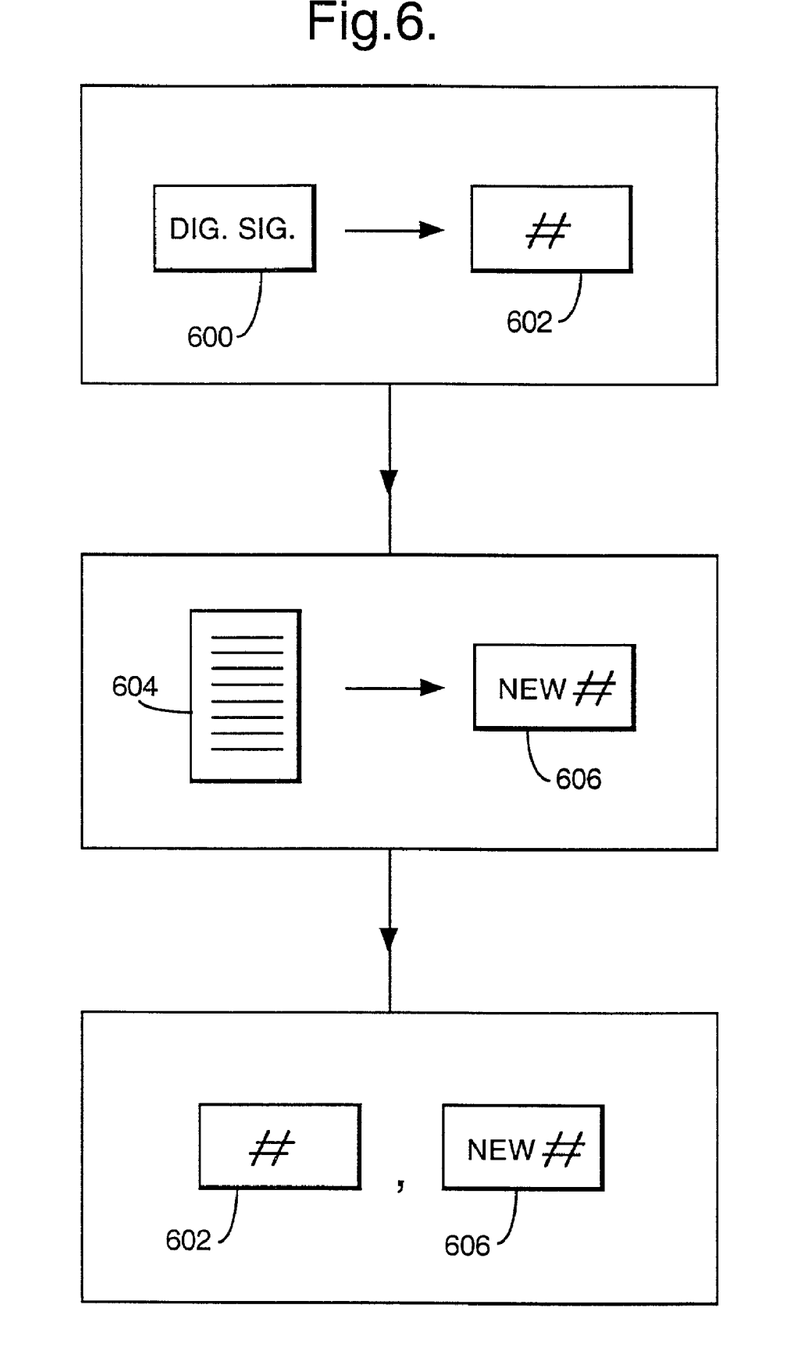
FIG. 6 illustrates the entities involved in the process of FIG. 5.

A procedural flowchart of the process of digital signature validation is illustrated in FIGS. 5 and 6. This process of digital signature validation provided for in step 406 will now be discussed having regard to FIGS. 5 and 6 before returning to discussion of the steps as illustrated in FIG. 4. It will be appreciated that the structure of FIGS. 5 and 6 is mirrored; FIG. 5 illustrates a procedural flowchart of the process of digital signature validation whilst FIG. 6 illustrates in simple fashion the behaviour of the corresponding entities.

Having regard to FIG. 5, in a first step 500, the digital signature associated with the document is decrypted with a public key, in this case the public key corresponding to the private key first used to sign the hash or message digest of the document. As will be well known this decryption will yield the hash of the document. The digital signature 600 associated with the requested document and the hash 602 obtained through the decryption are illustrated in FIG. 6.

In a second step 502, the document is again run through the same hash function as was originally used in the process of digitally signing the document. In this way a new hash of the document is derived. The document 604 and the new hash of the document 606 are illustrated in FIG. 6.

It will be appreciated that if the public key used to decrypt the digital signature associated with the requested document was not the matched public key for the private key used to sign the hash of the document, then the digital signature will not decrypt correctly. As a consequence, the hash of the document obtained through the decryption will not be the correct one and will not be the same as the new hash of the document. Similarly, it will be further appreciated that if the document has been altered in between the signing of the document including the generation of the hash and the generation of the new hash then the hash and the new hash will not be the same.

Consequently, in a third step 504, the hash of the document and the new hash of the document are compared. The comparison of the hash of the document 602 and the new hash of the document 606 is figuratively illustrated in FIG. 6.

If the hash and the new hash are identical then not only is it guaranteed that the party considered to have signed the document did in fact sign the document (i.e. the public key used in the decryption correctly matched the private key used to sign to document) but it is also guaranteed that the document has not been altered since generation of the digital signature (i.e. the hash of the document and the new hash of the document are identical). The comparison of the hash of the document and the new hash of the document returns a result to the authentication question posed in step 406. The digital signature associated with the requested document either passes the validation test or it does not.

Discussion of the document serving process may now return to a consideration of FIG. 4.

If the digital signature is validated then, in a fifth step 408, the Web Server proceeds to send the Web Page to the requesting party, in conventional fashion.

It is to be noted that, in a more general case, once the digital signature associated with a computer file has been validated, the server computer could allow access to the computer file other than sending the whole file at once to the client computer. By way of example, the server computer might instead open a communication session with the client computer and stream portions of the file to the client computer as required.

If the digital signature is not validated however, which is to say that either the document has been altered since the digital signature associated with that document was created or that the document was in fact signed by someone other than who was represented as having signed the document, then the Web Server will not proceed to send the document at all. Instead, in a sixth step 410, the Web Server will send a Web Page to the requesting party informing them that the Web Page that they have requested is not available.

In a seventh step 412, the Web Server might, for example, send a message to a system administrator, containing a warning as to the invalid digital signature.

It is to be noted that, at the present time, public key operations are relatively slow, being of the order of 100 to 1000 times more slow than hash functions or symmetric key operations. If a Web Server were to be checking the digital signatures in respect of every document served, it will be appreciated that this might quickly become a performance bottleneck. To ameliorate this problem, it is possible to use dedicated hardware boards optimised for the checking of digital signatures. One example of such a board is the one produced by nCipher of Cambridge, United Kingdom. Each such board will typically allow the checking of several hundred digital signatures per second, with the possibility of daisy-chaining further boards as required.

As mentioned above, it is quite possible that there will be a number of parties who might wish to digitally sign one of 'their' documents. Each such party will have their own private key with which to perform the relevant encryption. It will thus be necessary to provide a means by which each digitally signed file can be associated with the relevant signing party such that the appropriate matched public key can be used for the digital signature authentication.

One example of a means by which each digitally signed file may be associated with the signing party is simply to attach a copy of the digital certificate of the signing party to the digitally signed file. Having regard to FIG. 2, this might, for example, be performed in a further step following step 206. The well-known concept of the digital certificate, closely related to that of the digital signature, will not be discussed in any detail here. It will suffice to note that a digital certificate binds the identity of a party to the public key of that party and is itself signed by a third party, usually denoted a Trusted Third Party (TTP).

In this way, having regard to FIG. 4, when a digitally signed file is retrieved in steps 402 and 404, the attached digital certificate would also be retrieved. The digital certificate will provide the identity of the signing party and the associated public key of the signing party. Having regard to FIG. 5, this public key may then be used in step 500, to obtain the hash of the digitally signed document as required in the authentication process.

If the digital certificate attached to the file is not the digital certificate of the signing party then the authentication will fail. It is possible to consider however that an unauthorised third party manages to smuggle a digitally signed file onto the Web Server with a matched digital certificate. A subsidiary problem which therefore arises is the controlling of which parties are authorised to sign documents for storing on that particular Web Site.

A list of authorised signing parties may be constructed and stored on the Web Server; only the digital certificates of the authorised signing parties may be validly used. Since the next point of attack for an unauthorised third party would be to try and add a false 'authorised' signing party to the list, this list may itself be secured by signing it with the private key of the system administrator. In this way, the list can only be read using the public key of the system administrator which ensures, as with the discussion of the stored documents above, that the list has not been tampered with and does in fact originate from the system administrator.

Another issue which may be of interest is the ensuring that documents with a limited 'life' are not served after a predetermined time or date. Having regard to FIG. 2, this might be achieved, in a further step following step 206, through the attachment of an 'expiry time- or date-stamp' to the digitally signed file. To prevent this expiry time-stamp being compromised, the digitally signed document with the attached expiry time-stamp might itself be signed in a yet further step with, for example, the private key of the system administrator.

Having regard to FIG. 4, in this instance when the digitally signed document is retrieved, in steps 404 and 404, the digitally signed document would have the expiry time-stamp attached and would be signed by the system administrator. In a further step then, the expiry time-stamp could first be retrieved through the decryption of the digitally signed document with the public key of the system administrator. In a yet further step, a check could then be performed to see if the relevant time or date had been passed. If the relevant time or date had been passed then the document would not be served.

A simple application of this embodiment according to the invention will now be discussed. The Web Server illustrated in FIG. 1 is taken to host a corporate Web Site. The Web Server will typically be protected by a corporate firewall as discussed above. Public computers having an Internet connection and being suitably equipped with Web Browsers might then be used to view Web Pages on this corporate Web Site. As will be well known these Web Pages might typically be used to present information about the company to the world at large.

A first situation might be considered where the company posts a document in the form of a Web Page on its corporate Web Site. The document has been digitally signed using the private company key in accordance with the above discussion of FIGS. 2 and 3. A member of the public requests access to this document, typically by clicking on the hyperlink associated with the document. In accordance with the above discussion of FIGS. 4, 5 and 6, the Web Server carries out an authentication of the digital signature of the document. In this first situation the authentication is successfully carried out and the Web Page served to the member of the public making the request without further ado.

A second situation might now be considered where again the company posts a document in the form of a Web Page on its corporate Web Site. The document has been digitally signed using, for example a private company key in accordance with the above discussion of FIGS. 2 and 3. In this situation however, unbeknownst to the corporate Web Site administrator, the corporate firewall has been compromised and an unauthorised third party has gained access to the Web Server. Using this access, the unauthorised third party has then proceeded to alter one or more of the Web pages stored on the Web Server. The alterations effected by this unauthorised third party will depend on their motives for mounting such an attack; it is however unfortunately easy to conceive of a range of such motives from pranks to outright sabotage.

A member of the public might now be considered as requesting access to a document which has been altered by the unauthorised third party. In accordance with the above discussion of FIGS. 4, 5 and 6, the Web Server carries out an authentication of the digital signature of the document. In this second situation the authentication will fail due to the mismatch in the hash of the document and the new hash of the document.

The Web Page will therefore not be served to the member of the public making the request. Crucially, it will therefore not be possible for the member of the public making the request to see the altered document at all.

As indicated above, if the Web Page altered to suit the motives of an unauthorised third party intruder were allowed to be served to the member of the public making the request, albeit with a warning that the document was 'untrustworthy', then damage could nonetheless be done to the company's business or reputation.

A third situation might now be considered. In this situation, again unbeknownst to the corporate Web Site administrator, the corporate firewall has been compromised and an unauthorised third party has gained access to the Web Server. Using this access the unauthorised third party has posted a forged document in the form of a Web Page on the corporate Web Site of the company. The document has been digitally signed by the third party in accordance with the above discussion of FIGS. 2 and 3 but the private key used in the signing process was one selected by the unauthorised third party rather than that of the company.

A member of the public might now be considered as requesting access to a document which has been altered by the unauthorised third party. In accordance with the above discussion of FIGS. 4, 5 and 6, the Web Server carries out an authentication of the digital signature of the document. In this third situation the authentication will again fail. An attempt to decrypt the digital signature with the company public key when the digital signature was signed with an unauthorised third party private key will again cause a mismatch to occur in the hash of the document and the new hash of the document.

Yet again the Web Page will therefore not be served to the member of the public making the request and again, crucially, it will therefore not be possible for the member of the public making the request to see the altered document at all.

The invention claimed is:

1. A server computer comprising:
   a store arranged to store at least one computer file at said server computer;
   a store arranged to store at least one digital signature at said server computer;

each computer file having an associated digital signature created using a signing key from at least one of a plurality of third parties, said signature being stored on said server computer;

a receiver arranged to receive a request from at least one other computer for access to at least one computer file stored on said server computer;

means arranged to retrieve said at least one requested computer file in response to said request;

means arranged to retrieve the digital signature or signatures, directly at said server computer, associated with said at least one requested computer file in response to said request;

means arranged to validate, directly at said server computer, the digital signature or signatures associated with said at least one requested computer file in response to said request; and means arranged to deny said other computer access to said at least one requested computer file if the digital signature or signatures associated with each respective requested computer file is invalid;

wherein, in the case where said digital signature is invalid, no further digital signature is applied by said server computer and maliciously altered documents are not sent to said other computer by said server computer.

2. A server computer as in claim 1 further comprising:

a store arranged to store a list of approved computer file signing parties;

each computer file signing party having at least one associated signing key with which to create digital signatures; and in which said means arranged to validate the digital signature associated each requested computer file invalidates said digital signature if said digital signature was created with a signing key not associated with an approved computer file signing party.

3. A server computer as in claim 1 further comprising a clock, wherein each computer file stored on said server computer has an associated expiry date; such that:

said means arranged to validate the digital signature or signatures associated with said at least one requested computer file invalidates said digital signature if the current clock date is later than the expiry date associated with that computer file.

4. A server computer arranged to store at least one file, at least one digital signature, each computer file having an associated digital signature created using a signing key, said server computer being arranged to perform the operation of:

receiving a connection from another computer;

receiving, at said server computer, a request from said other computer for access to a computer file stored on said server computer;

in response to said request, retrieving said requested computer file;

in response to said request, retrieving the digital signature or signatures, directly at said server computer, associated with said at least one requested computer file; said computer file having an associated digital signature created using a signing key from at least one of a plurality of third parties, said signature being stored on said server computer;

in response to said request, validating, directly at said server computer, the digital signature or signatures associated with said at least one requested file; and denying said other computer access to said at least one requested computer file if the digital signature or signatures associated with said at least one requested computer file is invalid;

wherein, in the case where said digital signature is invalid, no further digital signature is applied by said server computer and maliciously altered documents are not sent to said other computer by said server computer.

5. A computer implemented method of operating a server computer comprising:

using at least one processor of a server computer to perform the following:

receiving, at said server computer, a request from at least one other computer for access to at least one computer file stored on said server computer; each said computer file having an associated unique digital signature created using a signing key from at least one of a plurality of third parties, said signature being stored on said server computer;

in response to said request, retrieving said at least one requested computer file;

in response to said request, retrieving the digital signature or signatures, directly at said server computer, associated with said at least one requested computer file;

in response to said request, validating, directly at said server computer, the unique digital signature or signatures associated with said at least one requested computer file; and providing said other computer with access to said at least one requested computer file only if the digital signature or signatures associated with said at least one requested computer file is valid;

wherein, in the case where said digital signature is invalid, no further digital signature is applied by said server computer and maliciously altered documents are not sent to said other computer by said server computer.

6. A computer program storage medium, said medium embodying computer readable code for loading into a computer and executable by said computer to perform the method of claim 5.

7. A method of operating a computer system comprising at least one server computer, client computers and a network interconnecting them, said method comprising:

storing files at a server computer, said files being associated with at least one respectively corresponding digital signature; each of said files having an associated unique digital signature created using a signing key from at least one of a plurality of third parties, said signature being stored on said server computer;

receiving at said server computer a request from a client computer for a file stored at the server computer; in response to said received request, retrieving at least one digital signature associated with the requested file and checking the validity directly at said server computer of the at least one digital signature corresponding to the requested file; and sending the requested file to the requesting client computer only if its associated at least one digital signature is found to be valid;

wherein, in the case where said digital signature is invalid, no further digital signature is applied by said server computer and maliciously altered documents are not sent to said client computer by said server computer.

8. A method as in claim 7 wherein at least one digital signature associated at the server computer with a stored file has been created from the file by the server computer using a signing key.

* * * * *